April 12, 1966     H. ULLRICH ETAL     3,245,762
APPARATUS FOR CONTINUOUSLY PERFORMING CHEMICAL REACTIONS
Filed April 5, 1963     3 Sheets-Sheet 2
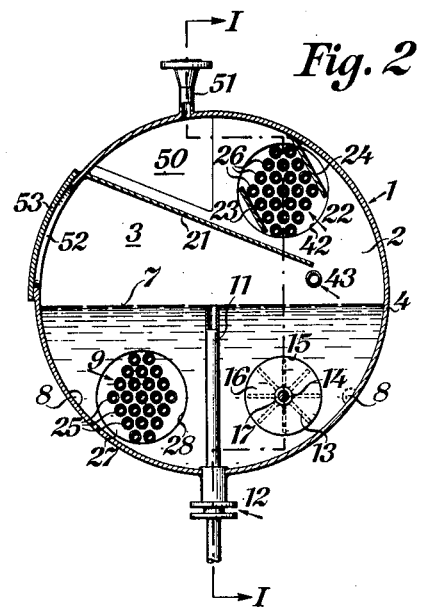
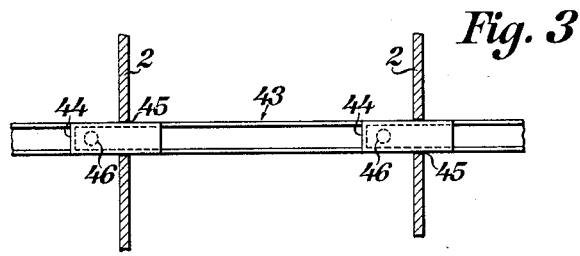
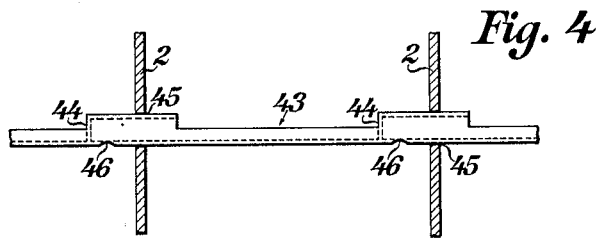
INVENTOR.
H. Ullrich
BY W. Kraft
Bair, Freeman & Molinare April 12, 1966   H. ULLRICH ETAL   3,245,762
APPARATUS FOR CONTINUOUSLY PERFORMING CHEMICAL REACTIONS
Filed April 5, 1963   3 Sheets-Sheet 3
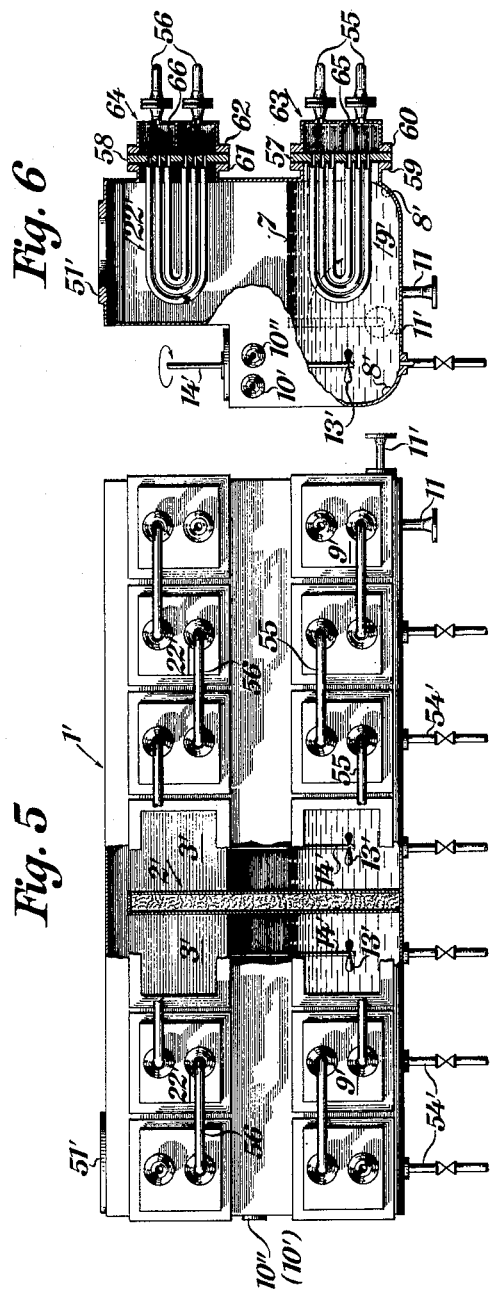
INVENTOR.
H. Ullrich
BY W. Kraft United States Patent Office 3,245,762
Patented Apr. 12, 1966

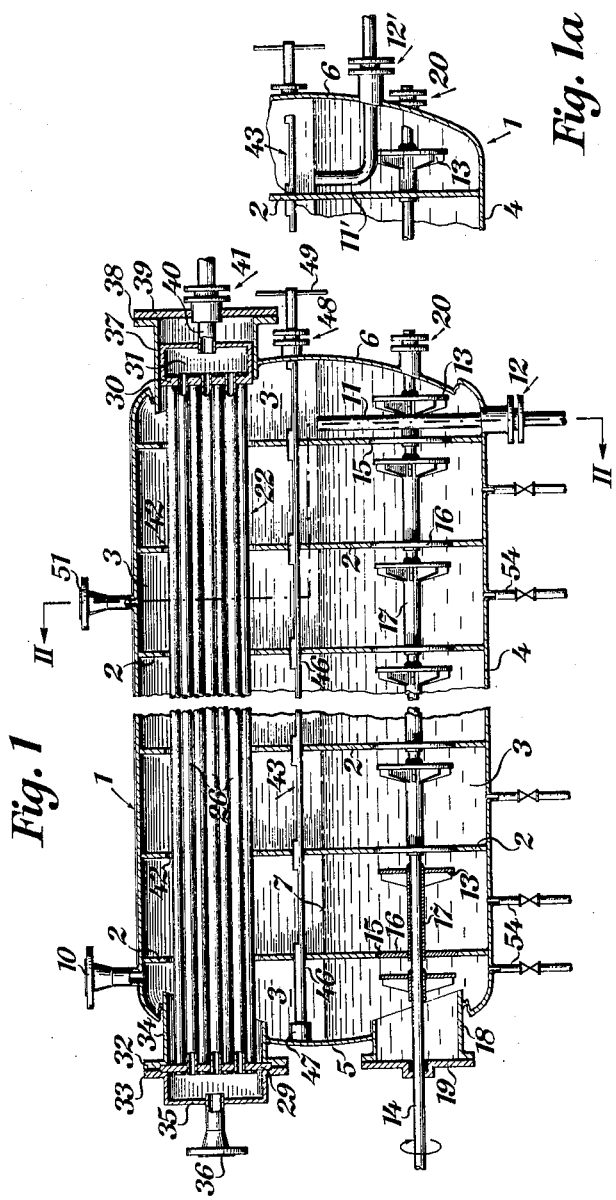

3,245,762
APPARATUS FOR CONTINUOUSLY PERFORMING
CHEMICAL REACTIONS
Hansjürgen Ullrich, Frankfurt am Main, and Wolfgang
Kraft, Bad Vilbel, Germany, assignors to Hans J. Zimmer Verfahrenstechnik, Frankfurt am Main, Germany
Filed Apr. 5, 1963, Ser. No. 270,916
Claims priority, application Germany, Apr. 6, 1962,
Z 9,347
8 Claims. (Cl. 23—285)

This invention relates to apparatus for continuously performing chemical reactions of low reactivity.

Chemical reaction apparatus, generally including connected reaction chambers having heat exchangers, has been used for chemical reactions requiring relatively long reaction times, differing heat requirements, and intimate mixing of reactants. Chemical reactions of this type include, for example, interesterifications, polymerizations, and polycondensations.

In one known apparatus, several separate agitating tanks are connected together in a cascade arrangement. The use of individual reaction tanks for forming separate reaction chambers is, however, extremely expensive. Further, provisions for reflux conduction of condensate are quite complex. Also, in this known construction, measuring and regulating devices are very complicated, expensive, subject to malfunction and require extensive maintenance. Still further, a great amount of space is required for this construction because separate foundations and supporting framework are required for the individual tanks.

Also, in performing the named chemical reactions, bell-bottom columns have been used. In this type of construction, the expenses for production, pipe lines, regulating and measuring devices, foundations, and supporting structures are lower, but bell-bottom columns will hold proportionally less liquid than the cascade systems and are therefore built considerably larger. Also, they do not allow heating to be independent of the reactant feed during the reaction. Additional drawbacks of bell-bottom columns are that the reactions time cannot be varied without altering throughput of material and that mechanical mixing of the reactants during the reaction is impossible.

It is therefore a primary object of this invention to provide improved apparatus for performing chemical reactions having low reactivity while substantially avoiding the disadvantages of known apparatus.

It is also an object of this invention to provide chemical reaction apparatus useful for exothermal, endothermal and even isothermal reactions between reactants in a liquid phase or in a suspension.

It is a further object of this invention to provide chemical reaction apparatus adapted to provide a relatively long reaction time.

It is another object of this invention to provide chemical reaction apparatus having relatively close control over the length of reaction time.

It is an additional object of this invention to provide chemical reaction apparatus having minimal space requirements.

It is still another object of this invention to provide chemical reaction apparatus having an agitator assembly which may be simply and rapidly installed or dismantled.

It is still a further object of this invention to provide chemical reaction apparatus having means for readily altering the liquid level and thereby the reaction time before or during the reaction.

It is another additional object of this invention to provide chemical reaction apparatus having means for condensing vapors in each of the reaction chambers.

It is also an additional object of this invention to provide chemical reaction apparatus having means for directing the condensate from each chamber back into the same chamber or into another chamber.

Further purposes and objects of this invention will appear as the specification proceeds.

Generally, our improved apparatus fon continuously performing a chemical reaction between reactants having relatively low reactivity comprises a generally horizontally disposed vessel or tank, walls dividing the tank into reaction chambers, means for allowing the reactants to pass from chamber to chamber, heat exchange means passing through the tank, an inlet provided in one of the reaction chambers at one end of the tank, and an outlet provided in the reaction chamber at the other end of the tank, the product outlet being adapted to determine the liquid level and thereby the reaction time in the tank.

Particular embodiments of the present invention are illustrated in the accompanying drawings, wherein:

FIGURE 1 is a broken, longitudinal sectional view through our improved apparatus, taken along line I—I of FIGURE 2;

FIGURE 1A is a fragmentary sectional view of another embodiment of the outlet tube used in the apparatus;

FIGURE 2 is a sectional view taken along line II—II of FIGURE 1;

FIGURE 3 is a detailed plan view of the condensate collecting tube;

FIGURE 4 is a front view of the collecting tube of FIGURE 3;

FIGURE 5 is a partially broken, front view of another embodiment of our improved apparatus; and FIGURE 6 is a partially broken, side view of the embodiment of FIGURE 5.

Referring to FIGURE 1, our inventive apparatus includes a generally horizontally disposed tank or vessel 1, which is divided by intermediate walls 2 into a number of reaction chambers 3. In the embodiment shown, the tank 1 is composed of a generally cylindrical shell 4 and tank ends 5 and 6, the intermediate walls 2 being conveniently welded in position. The cylindrical shell 4 may also be divided into a number of chambers 3 by tank sections which engage the intermediate walls 2 and are detachably flanged together. Insulation (not shown) may surround the tank in order to reduce heat losses.

As shown in FIGURE 2, the reaction chambers 3 are connected with one another in the region of the liquid, whose surface is indicated at 7, by the passage openings 8 situated in the walls 2. The passage openings 8 are staggered or offset from each other in order to lengthen the path of liquid travel from one wall 2 to the next wall 2. Instead of a single passage opening in each wall 2, several passages 8 may be provided at varying levels. The provision of passages 8 within the tank 1 is not absolutely necessary since the chambers 3 may also be connected with one another by pipe lines (not shown) located outside the tank 1. Although the passage openings 8 shown in FIGURE 2 are of equal cross section, the passage cross sections may vary. Also, the cross sections of the openings 8 may be made variable by the installation of slides, valves or the like (not shown), and particularly if the reaction chambers 3 are connected together by outside pipe lines.

In the liquid region, there is provided a heat exchanger 9 passing through the length of the tank 1, as shown in cross section in FIGURE 2. Further details of this heat exchanger 9 will be subsequently described withe reference to another, similar heat exchanger mounted in tank 1.

For feeding reactant, feed connecting pipes 10 are positioned in the end chamber 3 adjacent the tank end 5, one pipe 10 being shown in FIGURE 1. Instead of providing several feed connecting pipes 10 for separately feeding each reactant, only one connecting pipe 10 may be provided for supplying reactants ready-mixed or for supplying different reactants by a suitably multi-path valve (not shown).

The product withdrawal means in the end chamber 3, adjacent the tank bottom 6, comprises an elevationally adjustable overflow tube 11 extending into tank 1. In the embodiment of FIGURE 1A, the inner end of the overflow tube 11' is bent at approximately right angles. In this embodiment, level adjustments of the overflow tube 11' are made by turning the horizontal part of the overflow tube 11' so that the bent inner end swings, with a resulting change in the overflow level. The turning of the tube 11' may be accomplished by means of gear elements (not shown). The adjusted height of the opening of the overflow tube 11 or 11' in tank 1 determines the liquid level in the chambers 3. Since the average reaction time equals the quotient of volume of reactants in the tank 11 as divided by throughput of reactants, with a constant throughput, it is possible by height adjustment of the overflow tube 11 or 11' to alter the volume, and thus vary the average reaction time of the reactants in the tank 1.

In order to achieve an intensive mixing of reactants, the chambers 3 are provided in the liquid region with agitators 13, which are rigidly mounted on a common shaft 14, passing through the tank 1. For the desired mixing effect, the agitator 13, as shown in FIGURES 1 and 2, may be a turbine agitator drawing with suction on one of its sides. For facilitating installation and dismantling of the agitator 13, the walls 2 are provided with passage openings 15, having diameters dimensioned so that the agitators 13 can pass through during installation or dismantling. In order to prevent undesired passage of reactants from chamber to chamber through the openings 15, separating discs 16 are secured to the agitator shaft 14 and close the openings 15, simultaneously supporting the agitator shaft 14. In order to provide for rotation of the agitator assemblies, the openings 15 and the plates 16 are circular. Also, the separating plate diameter may be smaller so as to provide free turnability of the agitator assembly in the openings 15. In this construction, a gap results between the separating plate diameter and the opening 16 in the wall 2, thereby allowing the passage of the fluid. Thus it is possible to dispense with the passage openings 8 in the separating walls 2. It is also possible to provide separating plates 16 with passage openings and to dimension the diameters of the separating plates 16 and the openings 15 so that the shaft 14 is supported, as shown in the embodiment of FIGURE 1. Also, as shown in FIGURE 1, a rigid or turnproof connection of the agitators 13 and the separating plates 16 to the shaft 14 is provided by tube sleeves 17, on which the separating plates 16 and agitators 13 are attached, as by welding. The sleeves 17 in turn are secured to the shaft 14, as by keys (not shown) or other known connections. The driveside end of shaft 14 passes to the exterior through a connecting piece 18 secured to the tank bottom 5. The diameter of the connecting piece 10 is selected in such a way that the separating plates 16 and agitators 13 can pass through during installation. A cover 19 is detachably flanged to the connecting piece 18 and sealably carries the shaft 14. The other end of shaft 14 is sealably carried in a packing box 20.

In each reaction chamber 3, as shown in FIGURE 2, an inclined guide plate 21 is attached and lies in contact with both side edges on the adjacent walls 2, with its outer edge on the inside wall of the tank shell 4, and with the edge located closest to the liquid surface, ending at a distance from the tank shell 4. Between guide plate 21 and tank shell 4 and above the guide plate 21, another heat exchanger 22 extends over the length of the tank 1. The heat exchanger 22 condenses the rising vapors, wholly or partially. Vapor guide plates 23 and 24 are arranged in each chamber 3 and conduct the vapors to the heat exchanger 22.

The heat exchanger 22 corresponds in its design essentially to the heat exchanger 9. Both heat exchangers comprise a bundle of grouped pipes 25 and 26. The pipes 25 of heat exchanger 9 pass through supporting walls 27 which are positioned in openings 28 in the walls 2, whereby the reaction chambers 3 are closed off from one another. In installing or dismantling the heat exchanger 9, the supporting walls 27 move with the bundle of pipes 25. In heat exchanger 22, supporting walls are also provided. Since the construction is similar, for a further description of the two heat exchangers, reference will be made only to heat exchanger 22.

The pipes 26 are, at their ends, rolled or welded into pipe bases 29 and 30, the pipe base 30 being a component of a collecting chamber 31 for the cooling agent. The pipe base 29 is held between flanges 32 and 33. The flange 32 is a component of a connecting piece 34 attached to the tank bottom 5, the diameter of the connecting piece 34 allowing both the passage of the bundle of pipes 26 and of the collecting chamber 31, during installation or dismantling of the heat exchanger. The flange 33 is a portion of a collecting hood 35 for the cooling agent, and carries a coolant feed or coolant discharge connecting piece 36. The collecting chamber 31 is carried by a pipe socket 37, which is secured to the tank end 6. The socket 37 is closed by a cover 39 attached to its flange 38. A coolant discharge or coolant feed pipe 40 communicates with the collecting chamber 31 and is carried by a packing box device 41 which is attached to cover 39. The pipes 26 pass through openings 42 in the walls 2 of the tank 1. The diameter of the openings 42 corresponds approximately to the inside diameter of sockets 34 and 37 and approximately to the outside diameter of the appertaining supporting walls.

Below the inner edges of the guide plates 21, a condensate collecting tube 43 is positioned. The tube 43 is turnable on its axis, and passes through the length of the tank 1. The collecting tube 43 is subdivided into sections, corresponding to the number of chambers 3, by dividing walls 44, as shown in FIGURES 3 and 4. The condensate collecting tube 43 is generally a half-pipe and only in the region of the walls 2, through openings 45, does it have a complete tubular cross section. The dividing walls 44 are staggered with respect to the walls 2 and each tube section includes a discharge opening 46 for the condensate, the opening 46 being positioned outside the reaction chamber 3 allocated to the particular tube section.

Depending on the angular position of the condensate collecting tube 43, the condensate resulting in each chamber runs along guide plate 21, into the condensate collecting tube 43, into the allocated discharge opening 46, and finally into the adjacent chamber 3 or the condensate runs over the convex part of the condensate collecting tube 43 and back into the same chamber. With the possibility of conducting the condensate accumulating in one chamber, into another chamber, a change of concentration of liquid in the individual chambers can be achieved. In the examples represented in FIGURES 3 and 4, the condensate accumulating in one chamber runs in each case into the adjacent chamber. By suitable mounting of additional dividing walls in the condensate collecting tube 43, condensate accumulating in each chamber may be conducted to a chamber remote from the chamber of origin or may be distributed over several chambers. For such an embodiment, it is possible to provide axially parallel dividing walls (not shown) in the collecting tube 43.

The condensate collecting tube 43 is rotatably carried within the tank 1 by a bearing sleeve 47 attached to the tank end 5. The other end of the condensate collecting tube 43 is carried by a packing box 48 at the tank end 6 and includes an operating device, such as a hand wheel 49. Conveniently, markings may be placed on the hand wheel 49 and on the tank end 6 so that the particular position of the condensate collecting tube 43 is known.

In the walls 2 and above the guide plates 21, openings 50 are provided, so that there is a common vapor space for all the chambers 3. From this vapor space, vapors can be drawn off by a removal connecting pipe 51.

Each reaction chamber 3 may, as shown in FIGURE 2, have a cleaning opening 52 in the tank shell 4, closable by a cover 53. Further, as shown in FIGURE 1, each reaction chamber 3 has a lower removal connecting pipe 54, through which samples may be obtained for determining the progress of the reaction in the individual chambers 3. Further, the withdrawal connecting pipes 54 allow intermediate products to be drawn off and, if necessary, allow complete emptying of the chambers 3.

The manner of operation of the apparatus according to the invention is described in the following example of an interesterification reaction of dimethyl terephthalate and ethylene glycol to produce diglycol terephthalate and methanol.

Through the feed pipes 10, there are introduced into tank 1, melted dimethyl terephthalate, heated to about 160° C., as well as ethylene glycol and a suitable catalyst, such as zinc acetate. The heat exchanger 9 is heated with heat exchange fluid and has a temperature of approximately 220° C. in the feed zone which diminishes to about 160° C. in the discharge zone. The heat exchanger 22 is traversed by hot water or other heat exchange liquid and has a wall temperature of about 110° C. The reaction mixture runs through the chambers 3 by means of the passage openings 8, both reactants flowing in the same direction. After an average reaction time of about 5 to 6 hours, the interesterification is completed and the resulting diglycol terephthalate is continuously drawn off through the overflow tube 11 or 11'. The agitators 13 are driven during the entire process at about 350 r.p.m. and provide an intimate mixing of reactants. The agitators 13 may also be operated at a speed whereby liquid is sprayed so that under some circumstances, the methanol liberated in the reaction can better escape. The ethylene glycol evaporating during the reaction is condensed on the heat exchanger 22 and can be returned to a reaction chamber 3. The resulting methanol is drawn off through the removal pipe 51. By taking the heat exchanger 22 out of operation, the ethylene glycol reflux can also be completely prevented so that a methanol-glycol mixture leaves the connecting piece 51. By controlling the wall temperature of the heat exchanger 22, its fractionating effect is adjustable.

A special advantage of the apparatus of the invention over the bell-bottom columns lies in the fact that the vapors rising in each chamber no longer come into contact with the liquid of the other chambers, so that undesirable influencing of the reaction is avoided.

In the apparatus hitherto described, the intermediate walls 2 are shown as simple metal dividing walls, but it is also possible to provide walls of double-walled form, with an interlayer of insulating material, in order to achieve heat insulation between adjoining reaction chambers 3. This is a particular advantage if it is desired that there be relatively great temperature differences from chamber to chamber. As insulating materials, asbestos, glass fiber mats, or the like are suitable.

An arrangement of such double-walled construction is shown in the embodiment of FIGURES 5 and 6. A generally, horizontally disposed tank 1' has a generally boxlike shape with walls running substantially parallel and perpendicular to each other. The double-walled dividing walls 2' terminate in the vicinity of the upper wall of the tank 1, whereby a vapor space running over the length of the tank results. A vapor removal connecting piece 51' is connected to the vapor space. Also, the walls 2' include passage openings 8', which are staggered with respect to each other so as to lengthen the path or liquid travel from wall to wall.

The heat exchanging surfaces below the liquid surface 7 are organized into a number of pipe bundles 9', corresponding to the number of reaction chambers 3'. Correspondingly, the heat-exchanging surfaces above the liquid surface 7 are organized in pipe bundles 22'. The pipe bundles 9' and 22', which are advantageously interchangeable with each other, are connected by pipe lines 55 and 56. Each pipe bundle 9' or 22' consists of U-bent pipes which are inserted in pipe bases 57 and 58. The pipe bases 57 and 58 are held between flanges 59 and 60 and 61 and 62, respectively. The flanges 59 and 61 are welded to the tank 1', while the flanges 60 and 62 are a portion of the liquid chambers 63 and 64, which, by means of the dividing walls 65 and 66, define the liquid path through the pipe bundle. The liquid chambers of adjacent pipe bundles are connected with each other by the connecting pipe lines 55 and 56 in such a way that the heat-exchange media pass through the entire length of the tank 1'.

For feeding reactant, as shown in FIGURE 6, two feed connections 10' and 10" are provided, to which reactants, as dimethyl terephthalate and ethylene glycol, may be separately supplied.

The product removal can be executed similar to that described for the embodiments of FIGURES 1 and 1A. For example, a swingable overflow tube 11' can be provided. The product removal may also be accomplished by suitable fittings provided at the bottom connection piece 11.

As shown in FIGURES 5 and 6, the agitators 13', situated in the reaction chambers 3' are designed as individual agitators 13', which comprise propeller agitators, whose drive shafts 14', sealably pass through the tank 1'. The drive shafts 14' may in each case be provided with an individual drive, but it is also possible to provide a suitable transmission for a group drive.

In order to guide the vapors rising in the reaction to the pipe bundles 22', no additional guide plates are necessary, since the narrower upper portion of the tank 1', shown in FIGURE 6, provides for adequate vapor guidance, and simultaneously provides a suitable mounting for the rotating agitator shafts 14'.

The condensate formed on the pipe bundles 22' of each reaction chamber 3' flows in each case back into the same chamber. If another conduction of the condensate should be desired, then, guide plates and a condensate-collecting tube can be provided.

While in the foregoing, particular embodiments of the present invention have been described in detail, it is to be understood that all equivalents obvious to those skilled in the art are to be included in the scope of the invention, as claimed.

What we claim and desire to secure by Letters Patent is:

1. Apparatus for continuously performing chemical reactions between reactants having relatively low reactivity, said apparatus comprising a vessel, walls dividing said vessel into reaction chambers, means for allowing the reactants to pass from chamber to chamber, means passing through said vessel for separately heating said reactants in each individual reaction chamber, an inlet for reactants provided in the reaction chamber positioned at one end of said vessel, an outlet for product removal provided in the reaction chamber at the other end of said vessel, said outlet also being for determining the liquid level and thereby the reaction time in said vessel, agitator means in said reaction chambers for intimately mixing the reactants contained within said chambers, said agitator means being turbine agitators mounted on a common shaft passing through said reaction chambers, said walls dividing the vessel into chambers having openings which allow the passage of said shaft and said agitators for installation and dismantling, and separating discs attached to said shaft positioned within said wall openings.

2. Apparatus for continuously performing chemical reactions between reactants having relatively low reactivity, said apparatus comprising a generally horizontally disposed vessel, walls dividing said vessel into reaction chambers, means for allowing the reactants to pass from chamber to chamber, first heat exchanger means passing through said vessel below the liquid level of said reactants in said reaction chambers for heating said reactants, second heat exchanger means passing through said vessel above said liquid level for condensing vapors rising from said reaction chambers, an inlet for reactants provided in the reaction chamber positioned at one end of said vessel, and an outlet for product removal provided in the reaction chamber at the other end of said vessel, and a guide plate positioned above said liquid level and below said second heat exchanger means, said guide plate being adapted to guide the vapors to said second heat exchanger means.

3. Apparatus of claim 2 wherein means positioned beneath the lower edge of said guide plate are provided for collecting the condensate from said guide plate.

4. Apparatus of claim 3 wherein said condensate collecting means is a tube which is adapted to conduct condensate into its chamber of origin.

5. Apparatus of claim 3 wherein said condensate collecting means is a tube which is adapted to conduct condensate into remote chambers.

6. Apparatus of claim 2 wherein a vapor space common to all the reaction chambers is provided above said guide plate and vapor removal means are connected to said vapor space for removing vapors therefrom.

7. Apparatus for manufacture of polyester and polyester intermediates comprising a reaction vessel, walls dividing said vessel into a plurality of adjoining chambers, said walls being insulated to minimize heat transfer between adjacent chambers and having openings therein which are staggered from wall to wall to lengthen the path of liquid travel from one chamber to the next, heat exchange means disposed within said vessel in each chamber below the liquid level of reactants for heating said reactants, heat exchange means disposed within said vessel in each chamber above the liquid level of reactants for condensing vapor, agitator means in each chamber for intimately mixing reactants, an inlet for reactants provided in the reaction chamber positioned at one end of said vessel, and an outlet for product removal positioned in the reaction chamber at the other end of said vessel.

8. Apparatus of claim 7 wherein said insulated walls are double-walled dividing walls with an inner layer of insulating material.

References Cited by the Examiner

UNITED STATES PATENTS 2,108,990   2/1938   Morlock _____ 23—290 X

FOREIGN PATENTS 1,091,568   10/1960   Germany.

MORRIS O. WOLK, *Primary Examiner.*

JAMES H. TAYMAN, Jr., *Examiner.*